April 8, 1969
J. E. BECKER
3,436,916
HYDRAULIC COUPLINGS
Filed Oct. 2, 1967
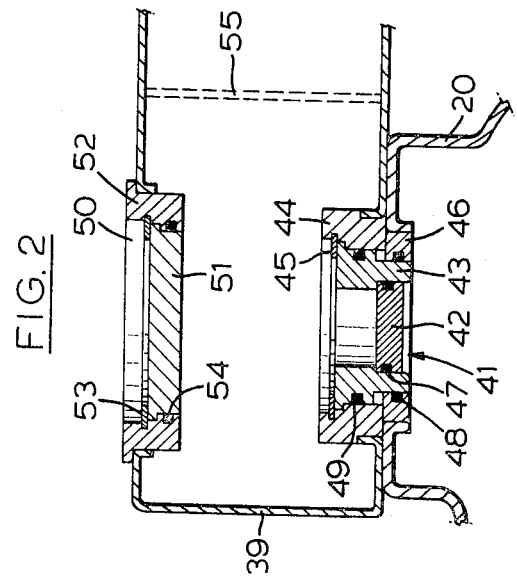
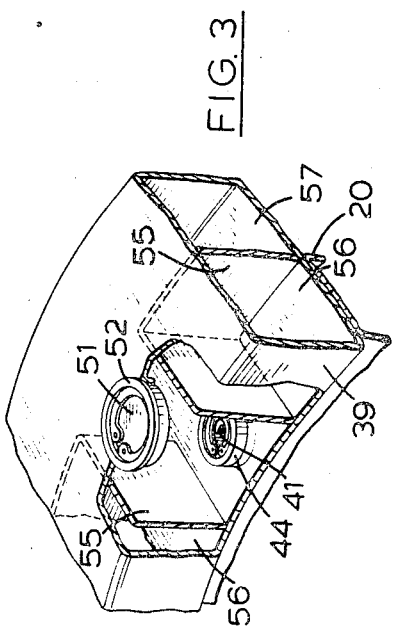
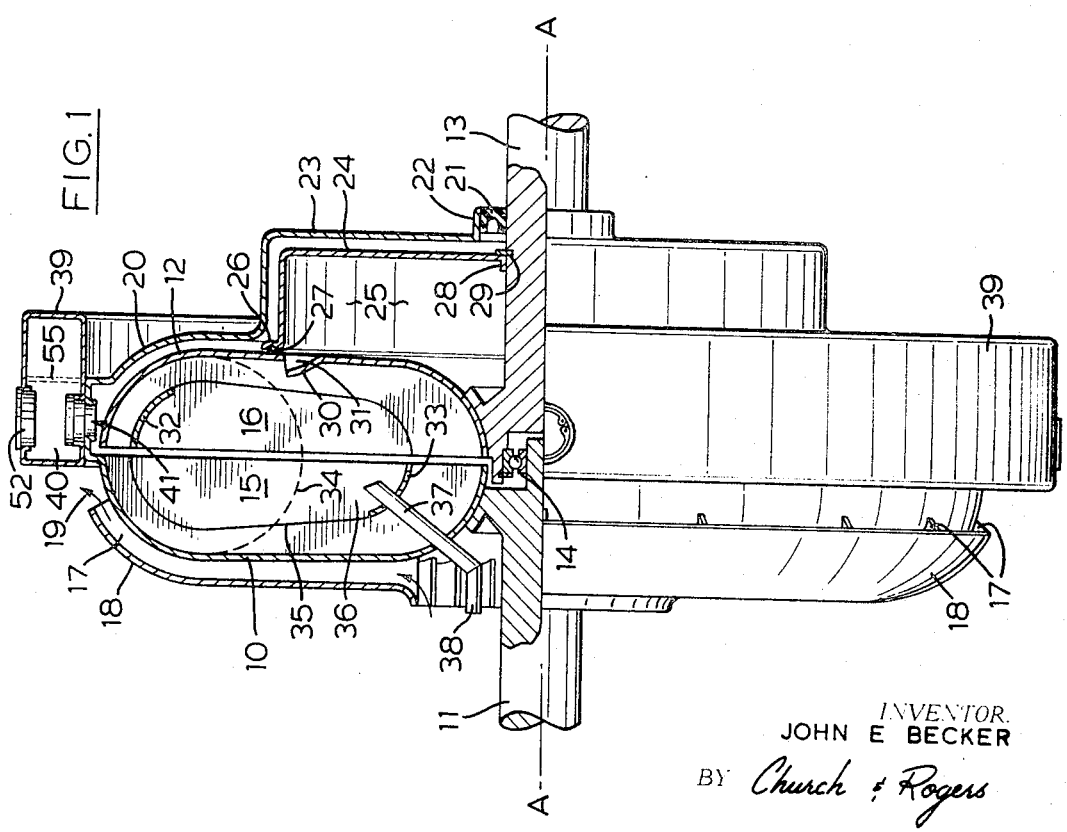
INVENTOR.
JOHN E BECKER
BY Church & Rogers
PATENT AGENTS United States Patent Office 3,436,916
Patented Apr. 8, 1969

3,436,916
HYDRAULIC COUPLINGS
John Edward Becker, R.R. 6, Bowmanville,
Ontario, Canada
Filed Oct. 2, 1967, Ser. No. 672,342
Int. Cl. F16d *31/06, 33/00;* F16h *41/00*
U.S. Cl. 60—54                                    4 Claims

ABSTRACT OF THE DISCLOSURE

A hydraulic coupling of the kind wherein the torque transmission capacity is reduced automatically to a predetermined value on overload or stall by removing a specific quantity of working liquid from the working chamber and delivering it to a first reservoir; a second reservoir is carried by the pump element and is connected to the working chamber interior by a temperature sensitive element, preferably a fusible plug; upon maintenance of the overload or stall condition the working liquid heats and increases the coupling torque transmission capacity; at a predetermined temperature the temperature sensitive element releases more liquid to the second reservoir to keep the torque transmission capacity at the said predetermined value.

Background of the invention

This invention is concerned with improvements in or relating to hydraulic couplings, of the kind comprising a pump element and a turbine element (sometimes known respectively as an impeller element and a runner element), each provided with a plurality of radially-extending vortex-producing vanes, the interiors of the elements together forming a working chamber containing a quantity of working liquid, usually an oil, and the two elements being coupled together for the transmission of torque between them by liquid vortices that are established in the working chamber between the said vanes.

Hydraulic couplings are commonly employed in power transmission systems between a prime mover, such as an internal combustion engine or an electric motor, and a load to be driven by the prime mover. In an ideal arrangement the torque transmitted by the coupling is negligible while the prime mover is idling and increases smoothly and progressively to a maximum when the prime mover reaches its designed optimum speed range; if at any time the coupling output member is overloaded or stalled, the maximum torque that can be transmitted by the coupling is automatically limited to a value such that the prime mover continues to run within its optimum torque range.

Even when operating at maximum efficiency the two coupling elements must slip relative to one another, usually about 2-5%, to maintain the vortices, the power that is lost being dissipated in the form of heat in the working fluid, from which it is transmitted to the coupling structure and to the cooling means that are usually provided. If the coupling is subjected to an overload then the slip is increased, increasing the heat produced in the coupling, and if the load is completely stalled then substantially all of the power produced by the prime mover must be dissipated by the coupling via working fluid. The severe conditions of a lengthy complete stall commonly are met by the provision of a fusible plug which melts when the working fluid becomes too hot, and allows it to escape from the working chamber.

During the initial stages of an overload or stall the above-described automatic limit permits the prime mover to run at an optimum speed, but as the working fluid heats up the load imposed on the prime mover increases, creating the strong possibility that it will slow to below the optimum speed or even stall. In cases where an overload or stall is met by automatically reducing the quantity of working liquid, the amount of liquid remaining in the working circuit should be just sufficient to transmit the maximum torque capacity of the prime mover.

It is an object of the present invention to provide a new hydraulic coupling.

It is another object to provide a hydraulic coupling including means for automatically limiting the torque transmission capacity thereof upon existence of stall or overload conditions of the runner.

It is a further object to provide a hydraulic coupling of the kind specified, wherein the torque transmission capacity of the coupling upon the existence of stall or overload conditions on the runner is automatically limited by removal of successive predetermined quantities of working liquid from the working chamber thereof.

Definition of the invention

In accordance with the present invention there is provided a hydraulic coupling comprising power input means and power output means, a pump element and a turbine element having respective radially-extending vortex-producing vanes and connected respectively to the power input and power output means to be rotatable therewith about a common axis, the said elements providing respective pump and turbine chambers each having a respective inner wall, the said chambers together constituting a working chamber, a quantity of working liquid in the working chamber, a first liquid reservoir rotatable with the turbine element and for the reception of a first predetermined quantity of working liquid from the working chamber, means for the interception of working liquid upon the existence of an overload or stall condition, duct means connecting said intercepting means and the reservoir interior for delivery to the latter of the said first predetermined quantity of said intercepted working liquid, a second liquid reservoir rotatable with the pump element and disposed at a radially-outer part thereof for the reception under the action of centrifugal force of a second predetermined quantity of working liquid from the working chamber, and temperature responsive openable duct means connecting the working chamber and the second reservoir interiors for delivery to the latter of the said second predetermined quantity of liquid upon the liquid in the working chamber reaching a temperature such as to cause opening of the said openable duct means.

Description of the drawings

A particular preferred embodiment of the invention will now be described, by way of example, with reference to the accompanying diagrammatic drawing, wherein FIGURE 1 is a part-elevation, part-sectional view of a first embodiment, the upper part of the figure being a plane cross-section taken along the axis of rotation of the coupling, FIGURE 2 is a cross-section to an enlarged scale of a detail of the coupling construction, and FIGURE 3 is a perspective part-sectional view of another detail of construction.

Description of the preferred embodiments

The coupling illustrated herein comprises a pump element 10 mounted on a power input shaft 11 that is adapted to be connected to a prime mover, such as an internal combustion engine or an electric motor, and a turbine element 12 mounted on a power output shaft 13 that is adapted to be connected to apparatus to be driven via the coupling. The immediately adjacent inner ends of the two shafts 11 and 13 are mutually supported by a single ball bearing 14, the inner bearing race being mounted on a spigot on the end of the shaft 11 while the outer bearing race is mounted in a bore in the shaft 13, the two coupling elements being rotatable about a common axis A—A. The interiors of the two elements constitute respectively a pump chamber and a turbine chamber, these two chambers together forming the usual toroidal-shaped working chamber which contains a quantity of working liquid, usually an oil. Each chamber is provided with the usual radially-extending, vortex-producing vanes 15 and 16 respectively.

A plurality of radially-extending, air-moving vanes 17 are mounted on the exterior wall of the pump element 10, between the said exterior wall and a shroud member 18; as the pump element rotates cooling air is moved by the centrifugal action of the vanes over the outer surface of the pump element in the direction of the arrows 19. An extension 20 of the pump element surrounds the turbine element in known manner to retain the working liquid in the coupling, a sealing element 21 providing a rotatable, fluid-tight joint between the axially-extending, radially-inner end 22 of the extension 20 and the adjacent portion of the shaft 13. The extension 20 is provided with a toroidal-shaped enlargement 23 to accommodate a reservoir member 24 carried by the turbine element.

A first liquid reservoir 25 associated with the turbine element is of annular cross-section and is formed between the outer wall of the element and the member 24, which is generally cup-shaped and surrounds the turbine shaft 13. In the embodiment illustrated this member is a simple thin sheet metal stamping having its radially-outer end 26 shaped to embrace between itself and the adjacent turbine element outer wall a sealing O-ring 27, while its radially inner part 28 is turned to extend axially along the shaft 13 and thereby locate the member 25 radially. The member 24 is located axially by its engagement between the turbine element wall and a snap ring 29 on the shaft 13, the shape of the member 24 and the location of the snap ring being such that the former must be stressed in the axial direction to enable the snap ring to be fitted on the shaft, and thereafter the ring and the member will be held in firm engagement with one another by the resilience of the material of the member. It will be seen that the member 24 is not fastened to the element 12 and in fact no such fastening is required.

The turbine element is provided at a radially extending part of its wall with a plurality of catches 30 which extend into the working chamber, so as to intercept liquid flowing along the inner wall of the element, each catch delivering such liquid through an associated bore 31 in the element wall to the interior of the reservoir 25. Each catch means is located between two immediately adjacent vanes 16 and has associated therewith liquid directing means formed by a director plate 32 extending between the associated immediately adjacent pair of vanes and also extending generally coextensively with the adjacent radially outermost part of the turbine element wall.

The pump element also is provided with liquid directing means disposed at the radially inner entry part thereof, comprising director plates 33, each plate extending between an associated immediately adjacent pair of vanes. For a more detailed description of the operation and design of the catches 30 and the director plates 32 and 33 reference may be made to my application Ser. No. 593,235, filed Nov. 4, 1966, now Patent No. 3,363,417, granted Jan. 16, 1968.

In the operation of the coupling, with both elements at rest the working liquid drains under gravity to the lowermost part of the working chamber. As the pump element rotates the liquid is distributed around the chambers and the vortices which transfer the power between the two elements are quickly established, so that driving torque is applied to the turbine element, causing the turbine to rotate and to empty the reservoir under the action of centrifugal force through the bores 31. Under normal operating conditions (i.e. normal operating speed, normal load and about 2–3% slip), these vortices are established in the radially outermost part of the working chamber, and are of approximately circular cross-section in a plane containing the said axis A–A, having a boundary as indicated by the broken line 34 in FIGURE 1. It will be seen that these vortices are clear of the catches 30, so that under these conditions there is no transfer of working liquid to the reservoir.

If the turbine element is now stalled or overloaded, so that there is an appreciable increase in slip between the elements, the vortices begin to elongate radially inwards toward the axis A—A, and at a critical amount of slip, depending upon the particular coupling design, discussed in more detail in my above-mentioned application Ser. No. 593,235 they become completely disrupted and the liquid flows over the interior wall of the working chamber. When the vortices have elongated sufficiently to be intercepted by the catches 30, the latter will commence to transfer liquid to the reservoir, this transfer becoming progressively more efficient, until it reaches a maximum and the reservoir rapidly fills with liquid. At this point the turbine element is stationary or is moving so slowly that there is insufficient centrifugal emptying force to prevent this filling.

Liquid vortices are still established by the liquid flowing over the interior coupling walls, but the volume of liquid available to form them is reduced by the volume that has entered the reservoir, and their radial length is substantially increased, so that they are of what is called herein of "attenuated" form, being of generally hollow elliptical cross-section in the said plane, as indicated by the solid line 35 in FIGURE 1. By suitable choice of the dimensions of the working chamber with respect to the volume of the reservoir and the volume of working liquid employed, the attenuated vortices can be arranged to be capable of transmitting only the normal maximum output torque of the prime mover and for which the coupling was designed, so that the prime mover can continue to operate at an optimum speed at which it is producing the said normal maximum torque.

If the condition causing the overload or stall is subsequently corrected, the turbine element again begins to rotate causing flow of the working liquid under centrifugal force back into the working circuit and the rapid re-establishment of the normal liquid vortices. A similar effect is obtained if the prime mover is started under a substantial overload; thus the first effect of rotation of the pump element is to cause the liquid to flow over the element interior surfaces, with subsequent rapid filling of the reservoir and establishment of the attenuated vortices if the turbine element does not rotate, or rotates with high slip between the elements. The attenuated vortices will remain until the turbine element speed increases sufficiently for the normal vortices to be established.

It will be seen from FIGURE 1 that an annular volume of the chamber, indicated in FIGURE 1 by the reference 36, is not occupied either by the normal or the attenuated vortices, and it is therefore possible to provide vent means, carried by the pump element and venting the interior of the coupling to the ambient atmosphere surrounding the coupling, by arranging that the inlet to the vent is located in this annular volume. As illustrated the vent means for this embodiment comprises a vent tube 37 mounted in the wall of the pump element 10 and having a centrifugally opened valve 38 at its outer end. For a more detailed description of the operation and design of the vent means reference may be made to my application Ser. No. 592,023, filed Nov. 4, 1966, now Patent No. 3,399,533, granted Sept. 3, 1968.

In accordance with this invention the pump element extension 20 has an annular casing 39, constituting an annular second liquid reservoir 40, mounted at its radially outermost part. The interiors of the working chamber and the reservoir 40 are connected by at least one radially-extending duct means 41 that normally is closed by a temperature sensitive element constituted by a fusible plug 42. In this embodiment four such plugs are provided distributed equidistantly around the coupling circumference. Referring especially to FIGURE 2, the plug 42 is mounted in a member 43 that is in turn fitted for ready replacement into a socket 44 mounted in the casing 39, the member 43 being held in the socket by a snap ring 45. The lower part of the member 43 extends in sealing engagement with the inner face of a ring 46 mounted in the extension 20, sealing O-rings 47, 48 and 49 being provided where necessary.

If the overload or stall condition is maintained for any appreciable length of time the working fluid is heated and the torque transmission capacity of the coupling thereby increased. The fusing temperature of the plug 42 is made such that it melts before the said capacity has increased beyond the upper limit of an optimum range thereof, whereupon a predetermined quantity of working liquid is quickly passed under the action of centrifugal force to the second reservoir. The quantity of liquid that remains in the working chamber is such that the torque transmission capacity is restored to the optimum range, in which the prime mover still operates in its optimum torque range. It is also possible for the filling of the second reservoir to completely empty the coupling; such an arrangement requires that the prime mover is protected against the consequences of such unloading.

Once the plug 42 has melted the coupling will not return automatically to its normal condition when the overload or stall ceases, and the unit must be stopped and the plug replaced, a respective access opening 50 and closure member 51 being provided for this purpose, the member 51 being mounted in a ring 52 that is in turn mounted in the casing 39. A snap ring 53 holds the member 51 in place and an O-ring 54 seals the junction between the ring 52 and the member 51.

In a modification of the invention illustrated by FIGURE 3 the interior of the casing 39 is divided by a radially-extending internal partition 55 (indicated in broken lines in FIGURES 1 and 2) into corresponding second and third reservoirs 56 and 57. The second reservoir interior is connected to the working chamber interior by a respective diametrically opposed pair of the four fusible plugs, while the partition 55 is shaped, for example as illustrated by FIGURE 3, so that the third reservoir interior is connected to the working chamber interior by the other diametrically-opposed pair of plugs. The two plugs that close the ducts to the second reservoir melt at a first temperature, while the other two plugs melt at a second temperature higher than the said first temperature. If the working fluid reaches the first temperature the second reservoir is filled and the volume of working liquid removed from the working circuit is such that the torque transmission capacity is restored to its optimum range; if the stall or overload persists and the second temperature is reached the third reservoir is filled and the torque transmission capacity again restored to the optimum range, or the coupling is completely emptied.

What I claim is:

1. A hydraulic coupling comprising power input means and power output means, a pump element and a turbine element having respective radially-extending vortex-producing vanes and connected respectively to the power input and power output means to be rotatable therewith about a common axis, the said elements providing respective pump and turbine chambers each having a respective inner wall, the said chambers together constituting a working chamber, a quantity of working liquid in the working chamber, a first liquid reservoir rotatable with the turbine element and for the reception of a first predetermined quantity of working liquid from the working chamber, means for the interception of working liquid upon the existence of an overload or stall condition, duct means connecting said interception means and the reservoir interior for delivery to the latter the said first predetermined quantity of said intercepted working liquid, a second liquid reservoir rotatable with the pump element and disposed at a radially-outer part thereof for the reception under the action of centrifugal force of a second predetermined quantity of working liquid from the working chamber, and temperature responsive openable duct means connecting the working chamber and the second reservoir interiors for delivery to the latter of the said second predetermined quantity of liquid upon the liquid in the working chamber reaching a temperature such as to cause opening of the said openable duct means.

2. A hydraulic coupling as claimed in claim 1, and comprising second and third liquid reservoirs rotatable with the pump element and respective temperature responsive openable duct means connecting the interior of each reservoir with the working chamber interior, the duct means associated with the third reservoir opening at a higher temperature than the duct means associated with the second reservoir, the quantity of liquid delivered to the second reservoir upon opening of the duct means being such that the coupling torque transmission capacity remains within a predetermined range of values thereof.

3. A coupling as claimed in claim 1, wherein the said second reservoir comprises an annular chamber mounted around the periphery of the pump element casing.

4. A coupling as claimed in claim 1, wherein the said temperature responsive openable duct means comprise a duct normally closed by a plug fusible to open the duct at the respective temperature.

References Cited

UNITED STATES PATENTS

| 2,983,102 | 5/1961 | Sinclair | 60—54 |
| 3,008,688 | 11/1961 | Makowski. | |
| 3,165,894 | 1/1965 | Nelden | 60—54 |
| 3,363,417 | 1/1968 | Becker | 60—54 |
| 3,377,957 | 4/1968 | Bilton | 60—54 |
| 3,388,552 | 6/1968 | Bilton | 60—54 |

EDGAR W. GEOGHEGAN, *Primary Examiner.*

U.S. Cl. X.R.

103—115